No. 881,213. PATENTED MAR. 10, 1908.
J. R. WELCH.
TRIMMING MACHINE.
APPLICATION FILED MAR. 27, 1907.

3 SHEETS—SHEET 1.

WITNESSES:
J. H. Gardner.
M. D. Beaty.

INVENTOR:
John R. Welch,
BY
E. T. Silvius,
ATTORNEY.

No. 881,213.  
J. R. WELCH.  
TRIMMING MACHINE.  
APPLICATION FILED MAR. 27, 1907.
PATENTED MAR. 10, 1908.
3 SHEETS—SHEET 2.
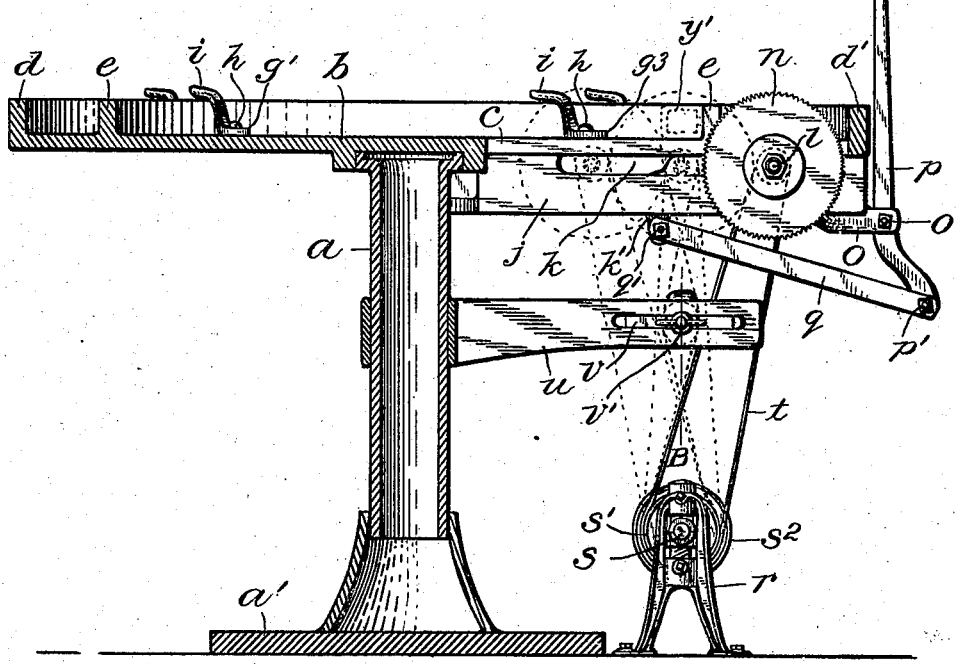
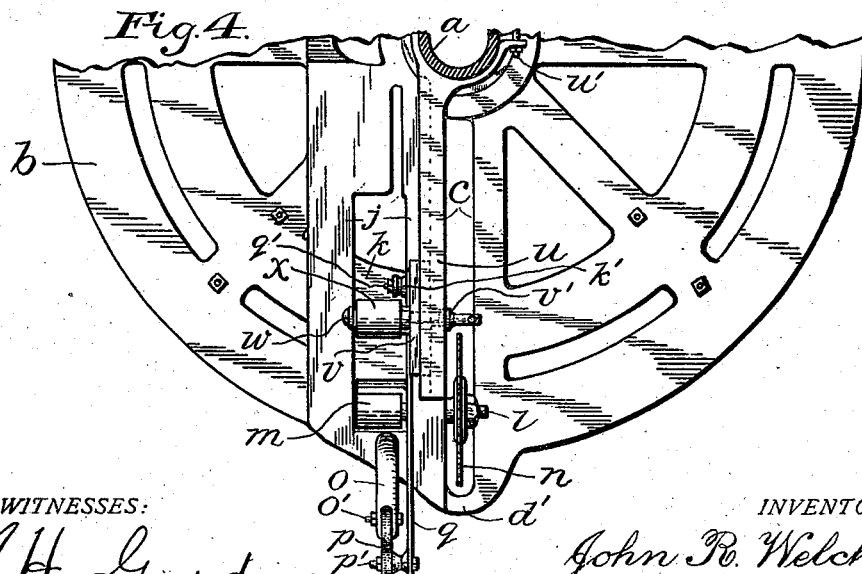
WITNESSES:
J. H. Gardner
M. D. Beaty
INVENTOR:
John R. Welch,
BY E. T. Silvius,
ATTORNEY.

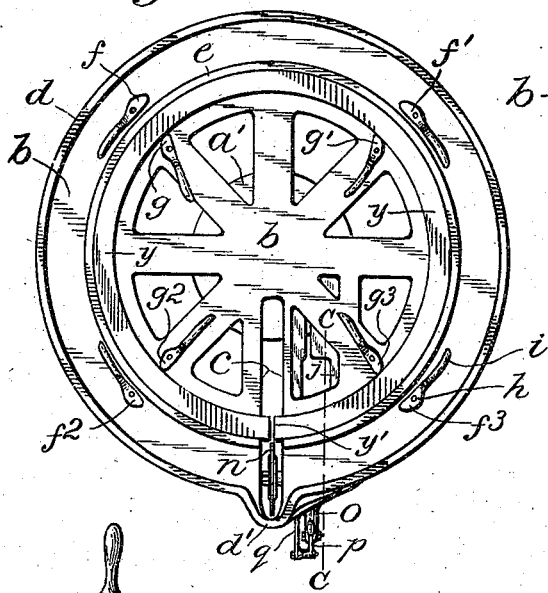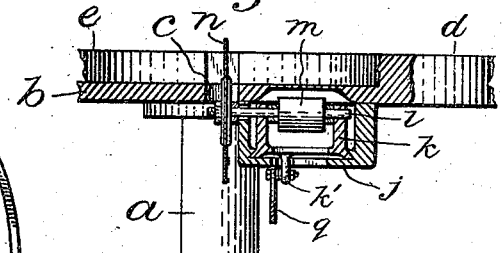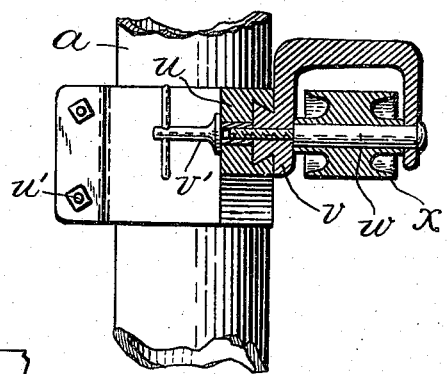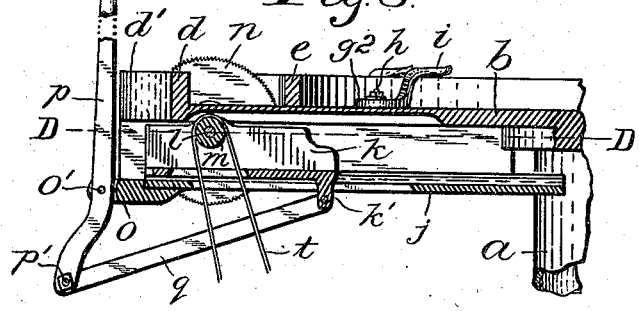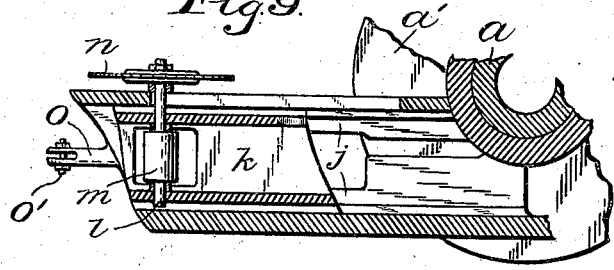

UNITED STATES PATENT OFFICE.

JOHN R. WELCH, OF ALEXANDRIA, INDIANA, ASSIGNOR TO KEEFER-HEART IRON AND STEEL COMPANY, OF ALEXANDRIA, INDIANA, A CORPORATION OF INDIANA.

TRIMMING-MACHINE.

No. 881,213.  Specification of Letters Patent.  Patented March 10, 1908.

Application filed March 27, 1907. Serial No. 364,904.

*To all whom it may concern:*

Be it known that I, JOHN R. WELCH, a citizen of the United States, residing at Alexandria, in the county of Madison and State of Indiana, have invented certain new and useful Improvements in Trimming-Machines; and I do declare the following to be a full, clear, and exact description of the invention, reference being had to the accompanying drawings, and to the letters and figures of reference marked thereon, which form a part of this specification.

This invention relates to machines that are adapted to be used for trimming the joint ends of such articles as wheel rims or fellies, bands, tires and the like, and the invention has reference particularly to a machine that is adapted especially for trimming the ends of metal after having been bent to form a metallic rim or felly for a wagon wheel, particularly when the felly is to be formed of a single piece of metal welded together at its ends so as to comprise an endless wheel rim or felly.

The object of the invention is to provide a trimming machine whereby the joint ends of either a one piece rim or a segmental rim may be trimmed accurately in order that any number of rims may all be equal in diameter when finished; and to provide a trimming machine of this character of which the operations may be performed expeditiously, which machine will be durable and economical in use.

The invention consists in a trimming machine comprising a table provided with one or more circular gages with which clamps coöperate to gage and hold a rim or the like on the table fixedly, and a saw spindle removable laterally under the table and rotatively supported in a carriage, there being a saw secured to the spindle, and means for moving the saw carriage. And the invention comprises also the novel parts and the combinations and arrangements of parts as hereinafter particularly described and pointed out in the appended claims.

Figure 1:
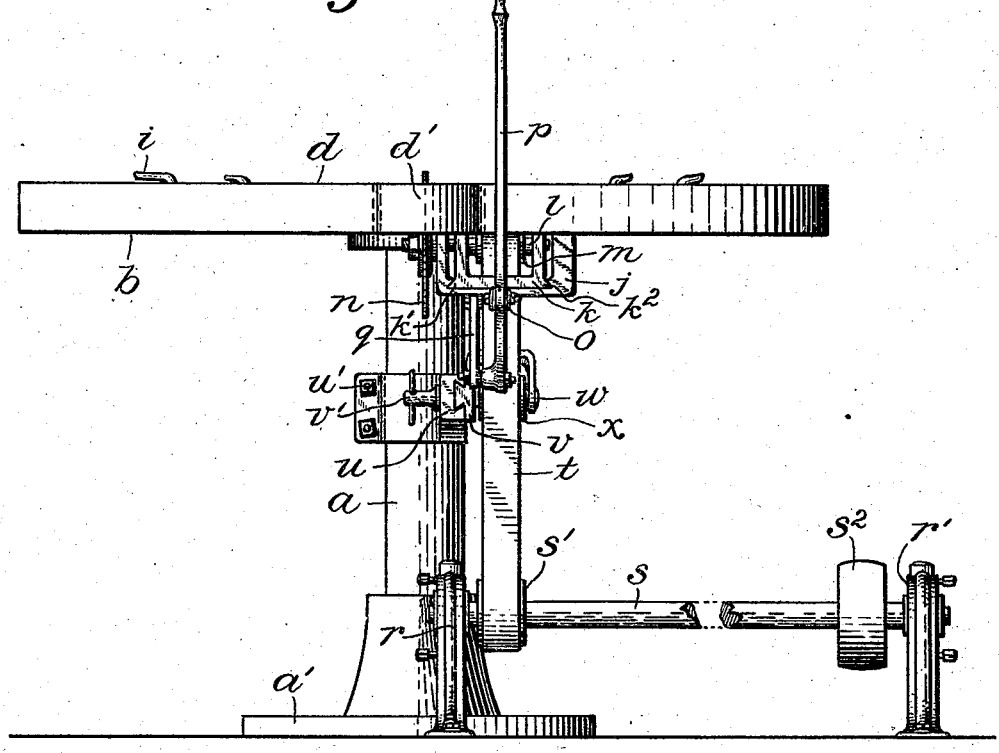
Figure 2:
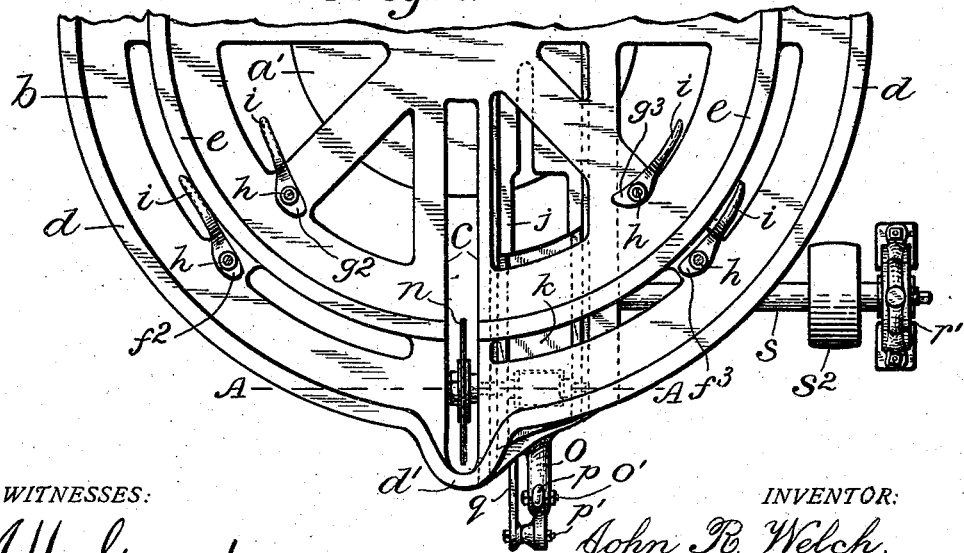

Referring to the drawings Figure 1 is a front elevation of the machine; Fig. 2, a fragmentary top plan; Fig. 3, a central vertical sectional view; Fig. 4, a fragmentary horizontal sectional view taken below the table of the machine and inverted; Fig. 5, a top plan of the machine on which a wheel rim is shown; Fig. 6, a fragmentary vertical sectional view on the line A A in Fig. 2; Fig. 7, a fragmentary vertical sectional view on the line B in Fig. 3; Fig. 8, a fragmentary vertical sectional view approximately on the line C C in Fig. 5; Fig. 9, a fragmentary horizontal sectional view on the plane of the line D D in Fig. 8; and, Fig. 10, a perspective view of the saw carriage.

Similar reference characters in the several figures of the drawings designate corresponding elements or features of construction.

The improved trimming machine comprises a suitable stand preferably in the form of a pillar $a$ having a supporting base $a'$, all being preferably composed of metal. A table $b$ is suitably mounted fixedly on the top of the pillar and is preferably composed of cast iron, being circular in plan and having a slot $c$ in a portion thereof extending approximately from the periphery nearly to the middle of the table in which the saw that is used for trimming may operate. On the top of the table at the periphery thereof is an upright circular gage $d$ having a gap at the slot $c$ and connected by an outwardly curved bridge $d'$ extending around the end of the slot, the bridge serving as a saw guard. Another circular upwardly extending guide $e$ is arranged on the top of the table concentrically to and smaller in diameter than the gage $d$ so that either one of two sizes of rims or fellies may be trimmed on the machine, the gage $e$ having a gap at the slot $c$. The gages $d$ and $e$ are shown as being integral with the table, but obviously may be made separately if preferred. It is designed that the wheel rims shall be placed against the inner sides of the gages and be held closely thereto by means of clamps which are upon the table, the clamps preferably comprising cams $f\,f'\,f^2\,f^3$ for the outer or larger gage $d$, and cams $g\ g'\ g^2\ g^3$ for the inner or smaller gage $e$. Each cam is mounted on a pivot $h$ and has an operating handle $i$.

At one side of the slot $c$ a suitable guide bar $j$ is supported beneath and by the table $b$, the guide bar being of the open type in which is mounted a carriage $k$ adapted to slide in the guide bar, the carriage having longitudinal guide bearings $k'$ and $k^2$ at opposite sides thereof, and it will be understood that suitable provision should be made for taking up lost motion due to wear of the carriage bearings or guide bar. A saw spindle $l$ is mounted rotatively in the carriage $k$ and has a drive pulley $m$ and also a saw $n$ attached thereto. By suitable means the carriage may be caused to travel so as to move the saw in the slot $c$ towards or from the center of the table and through the gaps in the gages $d$ and $e$.

The table is provided with a bracket $o$ having a pivot $o'$. A lever $p$ is mounted between its ends on the pivot $o'$ and has a pivot $p'$ in its shorter end part, there being a reach rod $q$ connected to the pivot $p'$ at one of its ends and having its other end connected by a pivot $q'$ to a bracket $k'$ with which the carriage $k$ is provided for moving and controlling the carriage by means of the lever $p$. A pair of shaft supports $r$ and $r'$ are suitably supported below the table $b$ and rotatively support a counter shaft $s$ to which is secured a pulley $s'$ and a pulley $s^2$, there being a driving belt $t$ connected with the pulley $s'$ and the pulley $m$ for driving the trimming saw. An arm $u$ is adjustably mounted on the pillar $a$ and provided with binding screws $u'$, there being a pulley housing $v$ mounted adjustably on the arm and adapted to be held fixedly by a binding screw $v'$; the housing supporting a shaft $w$ on which an idler pulley $x$ is rotatively mounted, it being designed that the belt $t$ shall be kept tight against the pulley $x$ during the movements of the saw spindle $l$ to different positions such as indicated by dotted lines in Fig. 3. A wheel rim or felly $y$ is shown in Fig. 5 with a trimmed joint $y'$, an end view of the joint end being indicated by dotted lines at $y'$ in Fig. 3.

In order to provide for the wide range of movement desired with respect to the travel of the saw carriage without excessive movement of the operating lever $p$, it is proposed to use two interchangeable reach rods $q$, one being somewhat longer than that one illustrated in the drawings, so that the longer rod may be substituted for the shorter one when arranging the machine so as to trim the smaller size of rims, the saw then operating from the position near the center of the table to the mid position indicated by dotted lines in Fig. 3, or in some cases with the shorter reach rod the saw may operate from its outermost position to the mid position.

In practical use the larger rims or fellies are to be placed against the gage $d$ and clamped thereto with the saw in mid position indicated by dotted lines in Fig. 3. The work is to be held first by means of the cams $f$ and $f'$ and either a cam $f^2$ or cam $f^3$, one joint end being held against the guide to be trimmed while the other joint end is forced upwardly out of the way of the saw, and after having trimmed one joint end it is to be lifted out of the way while the untrimmed one is to be clamped down in place and trimmed so that if now both ends be flat on the table and clamped to the gage the gap at the joint will amount to the thickness of the trimming saw and all joints may be trimmed with the same degree of accuracy and therefore when the joint ends are brought together and electrically welded the rims or fellies will all be equal in diameter externally, a matter of great importance in connecting metal tires to metal wheel rims.

Having thus described the invention, what is claimed as new is:—

1. A trimming machine including a table having a slot therein extending radially with respect to the middle portion of the table, an upright non-continuous gage mounted on the table and curved concentrically to the middle portion of the table, clamps mounted on the table to coöperate with the gage, a guide supported by the table, a carriage mounted on the guide, and a saw mounted on the carriage and extending through the slot of the table.

2. A trimming machine including a table having a slot therein and provided on the top thereof with a circular gage having a gap therein at the slot, clamps mounted on the table to coöperate with the gage, a guide bar supported by the table, a saw carriage movably supported by the guide bar, a rotative saw spindle mounted in the carriage and having a saw secured thereto that extends into the slot to be moved therein through the gap in the gage, and means for moving the carriage.

3. A trimming machine including a stand having an arm mounted thereon, a table secured on the stand and having a slot therein, a circular gage mounted on the table and having a gap therein at the slot, clamps mounted on the table opposite to the gage, a guide bar supported by the table at the under side thereof, a saw carriage movably supported by the guide-bar and having a saw spindle mounted rotatively therein, a saw secured to the spindle to be carried thereby in the slot of the table through the gap in the gage, a pulley secured to the spindle, a drive belt connected with the pulley, an idler pulley mounted adjustably on the arm opposite to the belt, and means for moving the saw carriage.

4. A trimming machine including a table having a slot therein and provided on the top thereof with a plurality of circular gages arranged concentrically and having each a gap therein at the slot on the table, clamps mounted on the table opposite to the gages to coöperate therewith, a guide bar supported by the table, a saw carriage movably supported by the guide bar, a rotative saw spindle mounted on the carriage, a saw secured to the spindle to be carried thereby in the slot and through the gaps in the gages, a drive pulley secured to the spindle, a lever pivoted to the table, and a reach rod pivoted to the lever and also to the carriage.

In testimony whereof, I affix my signature in the presence of two witnesses, on the 22 day of March, 1907.

JOHN R. WELCH.

Witnesses:
　　JOSEPH T. BRAMMEN,
　　SAMUEL G. PHILLIPS.